US005833285A

United States Patent [19]

Venezia

[11] Patent Number: 5,833,285

[45] Date of Patent: Nov. 10, 1998

[54] DEVICE FOR FACILITATING OPENING OF PULL-TOP CANS

[76] Inventor: J. William Venezia, 1622 Valencia Dr. W., Largo, Fla. 33778

[21] Appl. No.: 826,196

[22] Filed: Mar. 27, 1997

[51] Int. Cl.[6] .............................. A47J 45/10; B67B 7/00

[52] U.S. Cl. .............................. 294/27.1; 81/3.4; 294/33

[58] Field of Search .......................... 294/27.1, 28, 31.1, 294/31.2, 32, 33, 87.2, 87.28, 99.1, 99.2, 137, 146, 159, 165; 81/3.07, 3.09, 3.4, 3.41, 3.43, 3.44, 487, 488; 220/737, 752, 758

[56] References Cited

U.S. PATENT DOCUMENTS

| | | | |
|---|---|---|---|
| 970,206 | 9/1910 | Forster | 81/3.43 |
| 1,919,866 | 7/1933 | Schacht | 81/3.4 |
| 2,015,565 | 9/1935 | Loeber | 81/3.4 |
| 3,589,509 | 6/1971 | Mascia | 294/87.2 X |
| 3,664,497 | 5/1972 | Mascia | 294/87.2 X |
| 4,911,038 | 3/1990 | Ferrin | 81/3.4 X |

*Primary Examiner*—Johnny D. Cherry
*Attorney, Agent, or Firm*—Ronald E. Smith

[57] ABSTRACT

A device that spaces fingers away from lids of the type having sharp metallic edges when such lids are removed from cans of the pull-top lid type. The device further prevents movement of the can during the lid-removing process. The device includes a flat base having at least one opening configured and sized to receive the rim of a can. The opening is lined with a liner having a vertical surface that is gripped by the fingers during the can-opening process. Thus, the fingers are spaced apart from the edges of the lid when the lid is removed from the can. The palm of one hand rests atop the base and prevents it and hence the can from lifting during the opening process. In a preferred embodiment, a pair of openings of differing sizes are formed in the base, with the openings overlapping to reduce the length of the device. The shape of the opening can be any shape to accommodate differing shapes of cans.

14 Claims, 5 Drawing Sheets

DEVICE FOR FACILITATING OPENING OF PULL-TOP CANS

BACKGROUND OF THE INVENTION

1. Field of the Invention

This invention relates, generally, to devices that facilitate opening of cans of the type known in the industry as "full panel pull easy-open end" and more commonly known as the pull-top lid type of can. More particularly, it relates to a device that provides a surface to position the fingers of a person opening a can a predetermined distance away from the sharp edges of the lid and which also holds the can against movement during lid removal.

2. Description of the Prior Art

Pull top cans have lids that are pulled off by grasping a ring attached to the lid. A score or weakening line circumscribes the lid so that it separates from the top wall of the can when the ring is pulled upon. When the lid is pulled off of a pull top can, very sharp metallic edges of the lid are exposed; cuts to the hand holding the can during the lid-removal process are not unusual. The cuts can be quite deep and may require stitches to close. As a result, the pull top can industry has spent years looking for ways to reduce such injuries and the liability lawsuits that follow.

Possibly due to inconsistencies in the score lines, the lids are sometimes hard to pull off; the cuts inflicted by the lid edges are often deep because the person attempting the opening procedure often has to exert a considerable amount of force before the lid will begin separating from the top wall of the can; if the can slips at the moment the lid gives, injuries may result. Even if the can does not slip, injuries can still occur due to the close proximity of the fingers and thumb of the can-holding hand to the sharp edges.

Many pull-top cans are of shallow construction, i.e., they are short in height. Such cans are especially hard to open because one hand must grip the can while the other hand pulls on the lift tab. Tuna fish, sardines, pet food, and many other products are sold in shallow cans that are particularly hard to hold with one hand. Thus, the cans often slip from the grasp as the lid is pulled back, thereby increasing the chances of an injury occurring.

Accordingly, there is a clear need for a device that consumers could use to protect their fingers when opening cans of the pull-top lid type.

Moreover, since cans may be cylindrical in shape, square, oblong, and the like, there is a need for a device that can accommodate all can shapes.

There is also a need for a device that makes gripping shallow cans easier, and it would be very desireable to have a device for protecting fingers and for facilitating gripping combined in a single device.

However, in view of the art considered as a whole at the time the present invention was made, it was not obvious to those of ordinary skill in this art how a device having the needed features could be provided.

SUMMARY OF THE INVENTION

The longstanding but heretofore unfulfilled need for an apparatus that overcomes the limitations of the prior art is now met by a new, useful, and nonobvious invention. The present invention is a device for use with pull-top cans having lids with exposed sharp edges when pulled away from the can. It includes a flat base having an upper surface, a lower surface, and a peripheral sidewall of predetermined thickness. It further includes an opening formed in the base; the opening has a predetermined size and configuration and is adapted to slidingly receive a can of corresponding size and configuration having a longitudinal axis of symmetry disposed normal to a plane of the base. A lining is secured to the top surface of the base. The lining has a first part of predetermined extent that corresponds in size and configuration to the opening, and the first part is disposed orthogonally to a plane of the base and is spaced radially outwardly of the opening. A stop means is provided for limiting sliding insertion of a can through the opening to a predetermined extent. The lining has a second part connected to and disposed normal to the first part and parallel to the base; the second part extends radially inwardly for a predetermined distance from a free end of the first part. The predetermined distance is sufficient to position a radially innermost end of the second part radially inwardly of a perimeter of the opening by a predetermined distance; the second part is the stop means.

The radially innermost end of the second part defines a lid-receiving opening having a predetermined size greater than that of a pull-top lid so that the lid is removable from the can through the lid-receiving opening when a rim of the can is disposed in abutting relation to the stop means.

A person who, in the absence of the present invention, would hold the can in a first hand to stabilize it while the pull tab is pulled by a second hand, instead grips the lining while resting a palm of the first hand on the base and then pulls the lid off with a second hand. The lining spaces the first hand away from exposed sharp edges of the lid and the leverage provided by the palm of the first hand resting on the base prevents movement of the base and hence of the can.

It is a primary object of this invention to provide a device that protects the fingers of a person opening a can of the pull-top type.

Another object is to provide a device that facilitates gripping of cans that are of shallow construction.

Another important object is to provide a device that provides both protection from cuts and gripping convenience in a single device.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
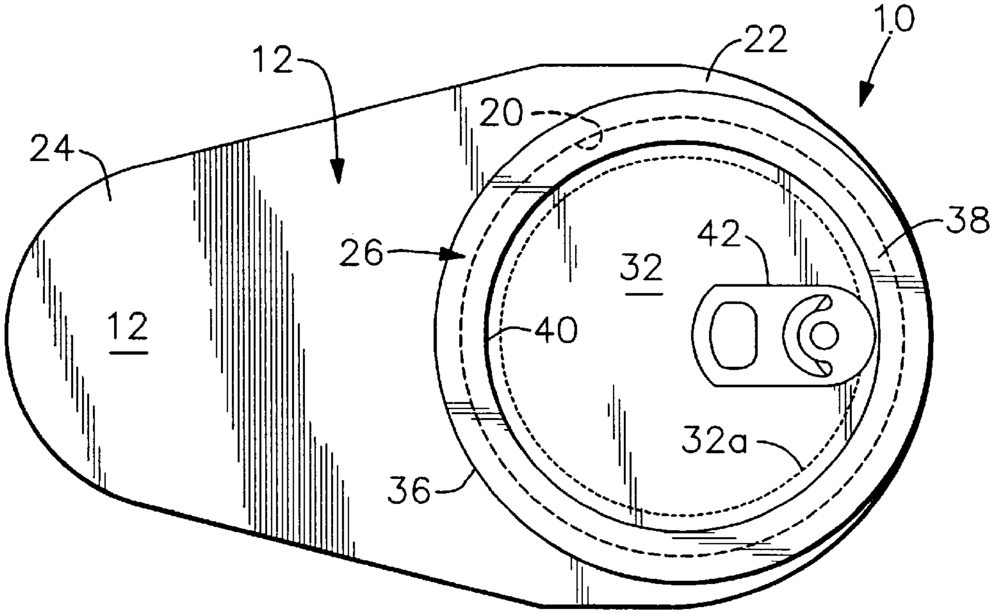
FIG. 1 is a plan view of a first embodiment of the novel device.
Figure 2:
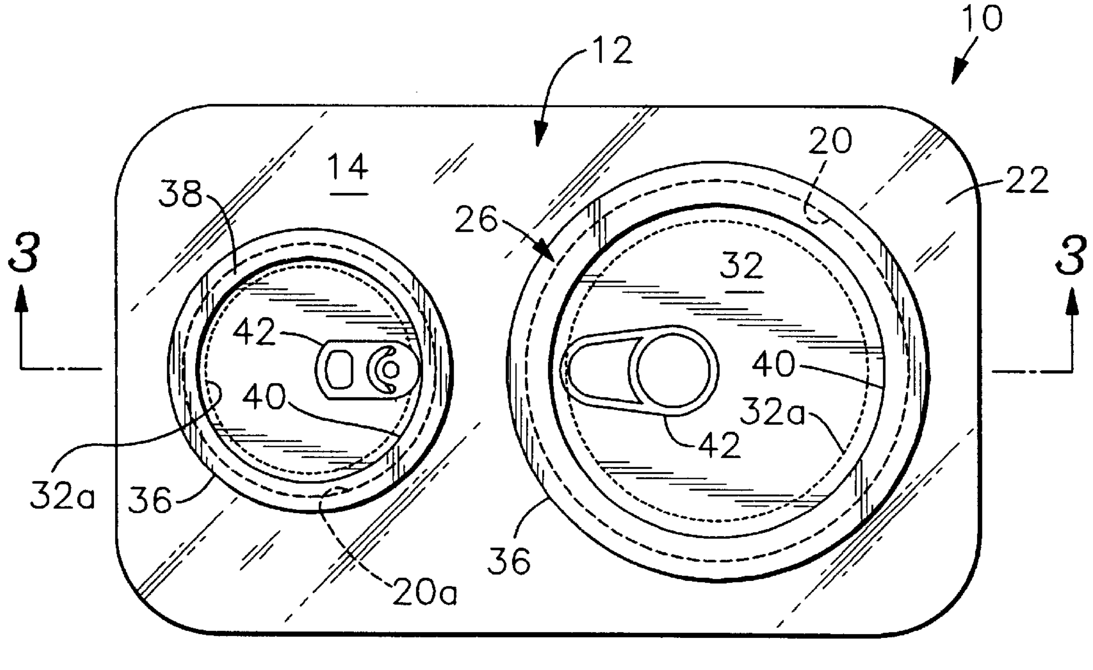
FIG. 2 is a plan view of a second embodiment of the novel device.
Figure 3:
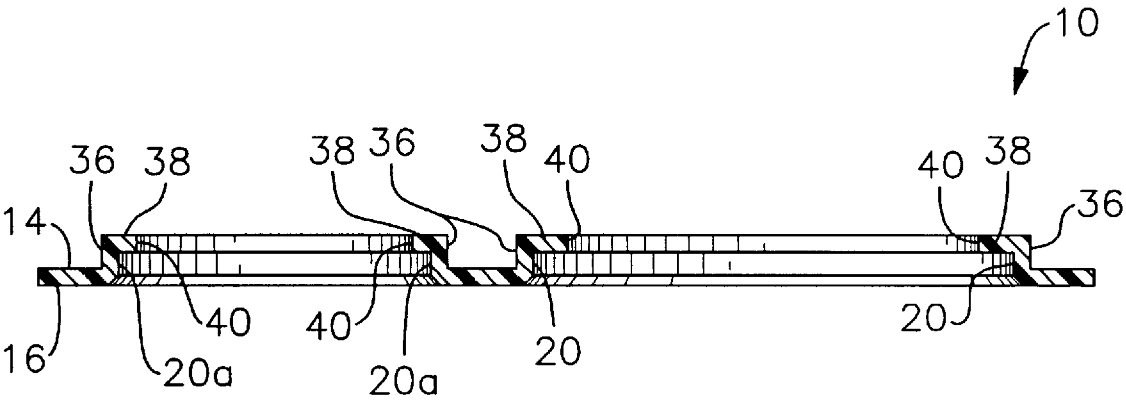
FIG. 3 is a sectional view taken along line 3—3 in FIG. 2.

Referring now to FIGS. 1–3, it will there be seen that the first two exemplary embodiments of the invention are denoted as a whole by the reference numeral 10.

Device 10 includes an elongate flat base 12 of predetermined thickness. Base 12 includes a top wall 14 and a bottom wall 16 (FIG. 3). Base 12 is preferably formed of an injection-moldable material.

In the first embodiment (FIG. 1), device 10 includes a single opening 20 formed in a first end 22 of base 12. As will become more clear as this description proceeds, second end 24 of base 12 supports the palm of a hand when device 10 is in use. In this particular embodiment, the transverse extent of second end 24 is slightly less than the transverse extent of first end 22.

Opening 20 is circular in configuration because the embodiment of FIG. 1 is employed with cylindrical cans. It should be understood from the outset, however, that opening 20 could be of any predetermined geometrical configuration such as square, oblong, etc., and it could be of any predetermined size. For example, it could be oblong to accommodate sardine cans, square with rounded corners to accommodate cans of that shape, and so on.

Figure 7:
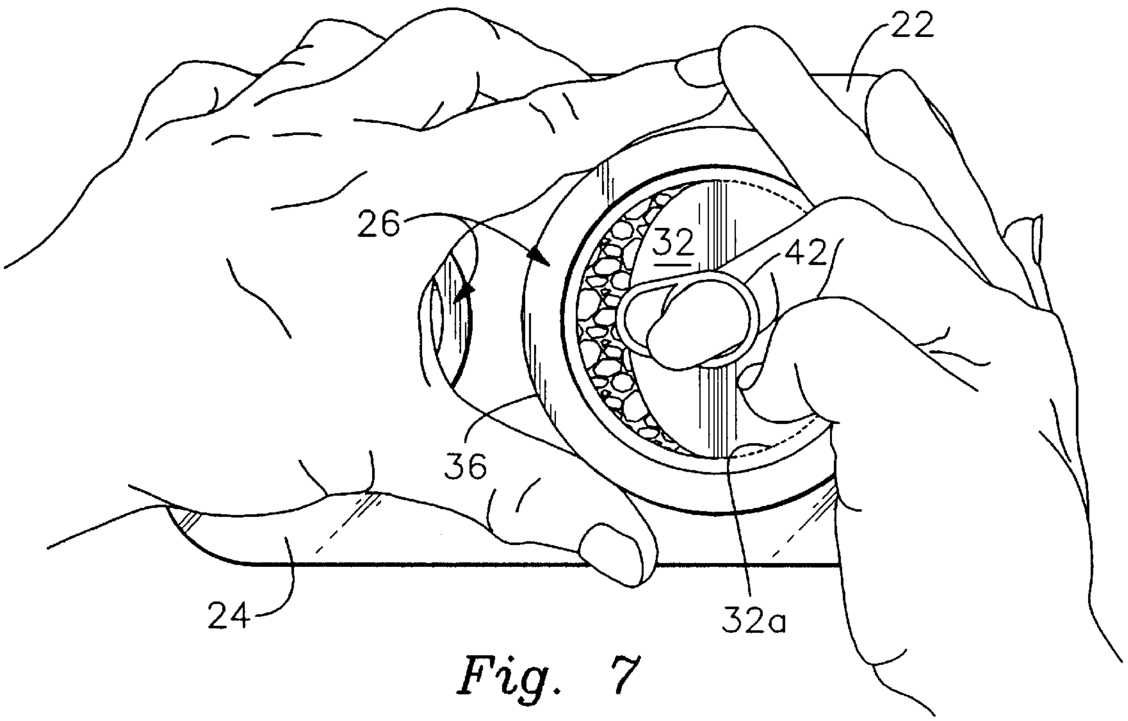
FIG. 7 is a perspective view depicting removal of a lid using the novel device.

Opening 20 is encircled by a lining 26 that is preferably formed of the same injection-moldable material that forms base 12, i.e., said base 12 and lining 26 are preferably of integral construction. As depicted in FIG. 7, lining 26 is grasped by a user of device 10 when a pull-top can is opened; note that the fingers and thumb of the hand gripping vertical surface 36 of lining 26 (see FIG. 3) are spaced apart from the sharp peripheral edges of lid 32. Note further that the palm of the gripping hand is comfortably rested atop second end 24 of base 12. As lid 32 is pulled upwardly, the can will tend to move. The leverage provided by the length of base 12 and the force supplied by the palm of the user's hand resting on second end 24 of base 12 prevent movement of the can, however, thereby further reducing the chances of an injury occurring during the can opening procedure.

As best understood in connection with FIG. 3, lining 26 has a vertical surface or first part 36 secured to or integral with top wall 14 of base 12 in orthogonal relation to base 12. Lining 26 further includes a second part 38 that is secured to or integrally formed with said first part 36 at the free end of said first part; second part 38 is orthogonally disposed with respect to said first part and is therefore parallel to the plane of base 12, i.e., second part 38 extends radially inwardly with respect to the longitudinal axis of opening 20. First and second parts 36, 38 are preferably integrally formed with one another and with base 12.

The radial extent of second part 38 is sufficient so that said second part 38 overhangs the perimeter of opening 20 by a predetermined distance. Such overhang serves as a stop means that limits the depth of insertion of a can through opening 20.

The radially innermost peripheral edge 40 of second part 38 defines a lid-receiving opening which permits removal of lid 32 from a can when lift tab 42 is pulled. Note in FIG. 7 how the fingers and thumb of the user are positioned upon vertical surface 36 of lining 26, in spaced relation to the sharp edges of lid 32; note further how the palm of the user's hand prevents movement of base 12. The score line that weakens lid 32 to facilitate its removal is denoted 32*a*.

FIGS. 2 and 3 depict the second embodiment. In this embodiment, there are two can-receiving openings denoted 20 and 20*a*, said openings being longitudinally spaced apart from one another by a predetermined distance as shown; the latter opening is smaller than opening 20. In this particular embodiment, the transverse extent of first end 22 of base 12 is substantially the same as that of second end 24. In all other respects, the structure of the second embodiment is the same as that of the first embodiment. The palm of the user's hand rests comfortably in the opening that is not in engagement with a can being opened, thereby providing the above-mentioned leverage that prevents movement of the can during the lid-removing procedure.

Figure 4A:
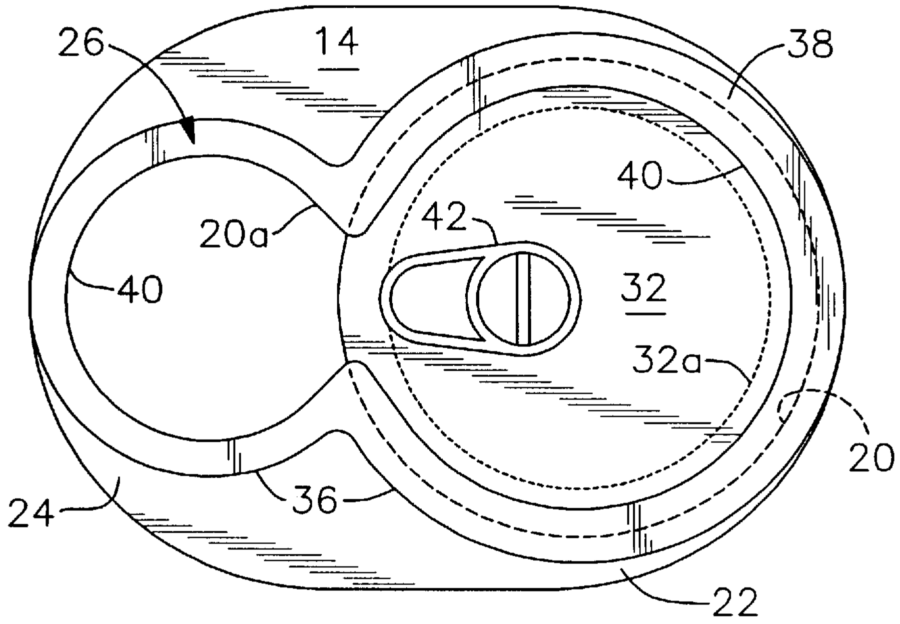
FIG. 4A is a plan view of a third embodiment of the invention when accommodating a relative large can.
Figure 4B:
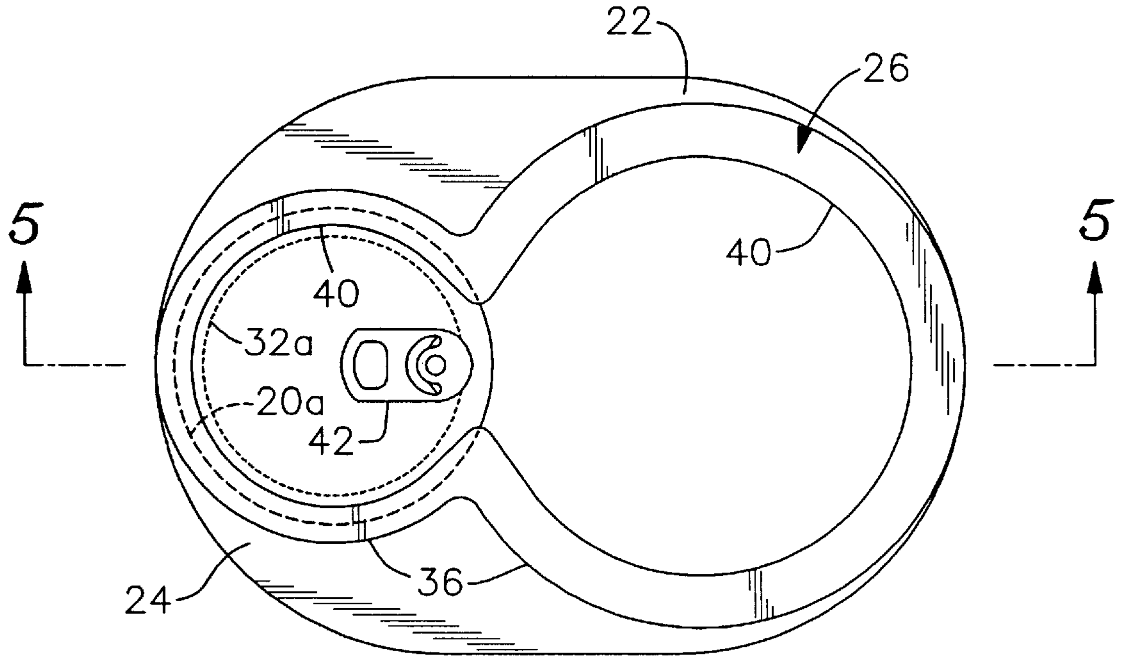
FIG. 4B is a plan view of the third embodiment like FIG. 4A but depicting use of the novel device with a can of a smaller size.
Figure 5:
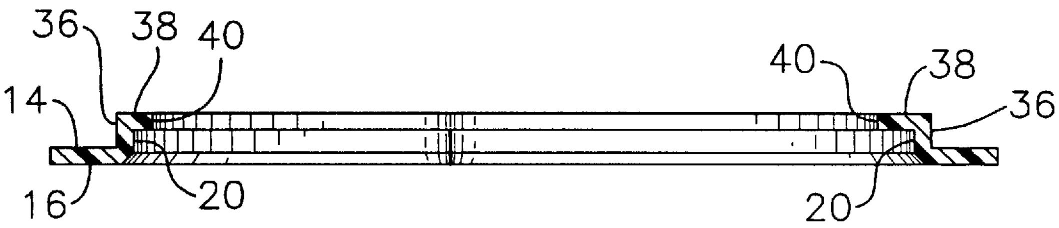
FIG. 5 is a sectional view taken along line 5—5 in FIG. 4B.

A third embodiment is depicted in FIGS. 4A and 4B. In this embodiment, openings 20 and 20*a* overlap one another as depicted. In this way, base 12 may be shortened in longitudinal extent, thereby saving materials without adversely affecting the performance of device 10. In all other respects, as indicated in FIG. 5, this embodiment has the same structure as the first two embodiments. FIG. 4A depicts a relatively large can accommodated within opening 20 and FIG. 4B depicts a relatively small can accommodated in opening 20*a*. Note that two cans may not be accommodated at the same time in this embodiment.

Figure 6:
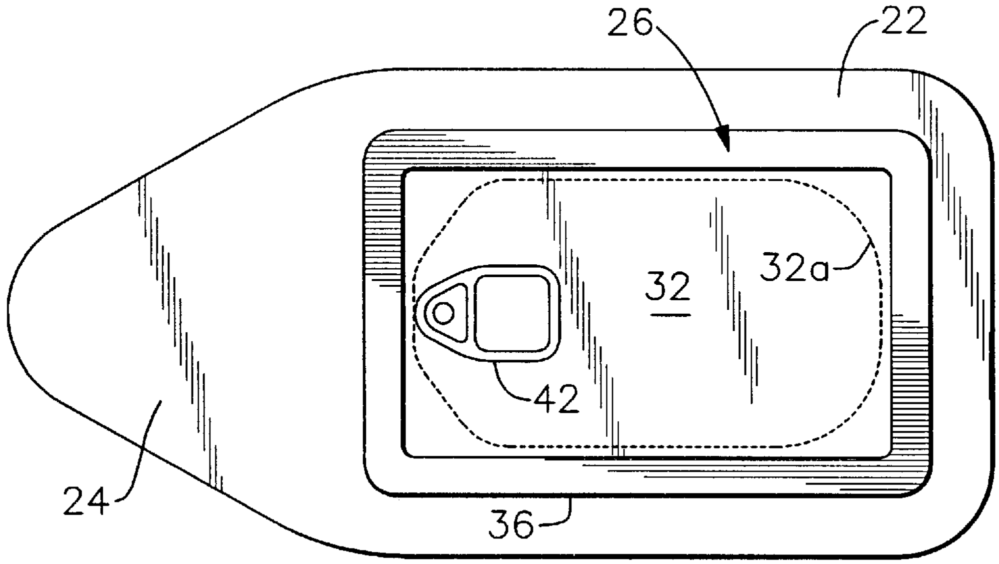
FIG. 6 is a plan view of a fourth embodiment of the invention.

FIG. 6 depicts an embodiment having utility in connection with an oblong can having an oblong lid. In view of the teachings of this invention, it should now be apparent that the shape of the novel can holder may be adapted to accommodate any can of any size or shape.

Figure 8:
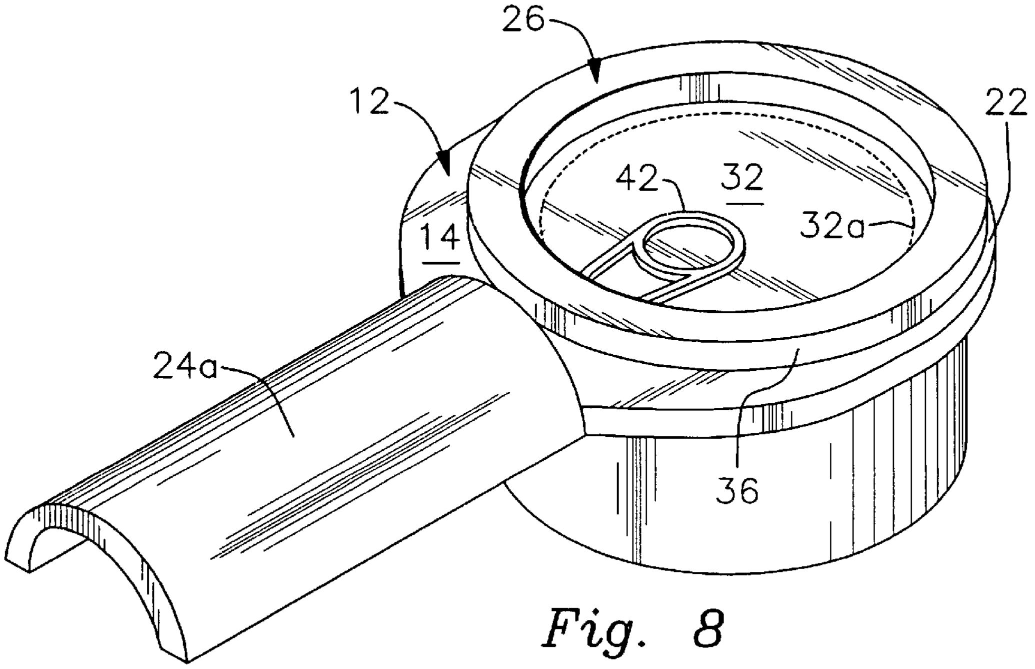
FIG. 8 is a perspective view of a fifth embodiment of the invention.

The FIG. 8 embodiment includes a handle 24*a* that may be gripped by a hand so that the fingers and thumb of the hand need not rest against liner 26 during the lid-pulling procedure. Handle 24*a* has a reduced transverse extent, i.e., the transverse extent of second end 24 is substantially less than that of first end 22 of base 12. Such handle is convenient for children or people having a condition that limits their ability to use the novel device in the manner depicted in FIG. 7.

Novel device 10 protects against cuts and helps prevent movement of shallow cans as well. Being formed entirely of an injection-moldable material, it is inexpensive to manufacture and is thus easily affordable by consumers.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for use with cans of the pull-top lid type having lids with exposed sharp edges when pulled away from the can, comprising:

a flat base having a predetermined thickness and having an upper surface and a lower surface;

an opening formed in said base;

said opening having a predetermined size and configuration and being adapted to slidingly receive a can of corresponding size and configuration having a longitudinal axis of symmetry disposed normal to a plane of said base;

a lining secured to said top surface of said base, said lining having a first part of predetermined extent that corresponds in size and configuration to said opening, said first part being disposed orthogonally to a plane of said base and being spaced radially outwardly of said opening;

a stop means for limiting sliding insertion of a can through said opening to a predetermined extent;

said lining having a second part connected to and disposed normal to said first part and parallel to said base, said second part extending radially inwardly for a predetermined distance from a free end of said first part, said predetermined distance being sufficient to position a radially innermost end of said second part radially inwardly of a perimeter of said opening by a predetermined distance, said second part being said stop means;

said radially innermost end of said second part defining a lid-receiving opening having a predetermined size greater than that of a pull-top lid so that said lid is removable from said can through said lid-receiving opening when a rim of said can is disposed in abutting relation to said stop means;

whereby a person grips said lining while resting a palm of a first hand on said base and then pulls said lid off with a second hand, said lining spacing said first hand away from exposed sharp edges of said lid and said palm preventing movement of said base and hence of said can.

2. The device of claim 1, wherein said first part is integrally formed with said second part.

3. The device of claim 2, wherein said lining and said base are integrally formed with one another.

4. A device for use with pull-top cans having lids with exposed sharp edges when pulled away from the can, comprising:

a flat base having a predetermined thickness and having an upper surface and a lower surface;

a first and a second opening formed in said base in spaced apart relation to one another;

each opening of said first and second openings having a predetermined size and configuration and said first opening having a differing size relative to said second opening and each opening being adapted to slidingly receive a can of corresponding size and configuration having a longitudinal axis of symmetry disposed normal to a plane of said base;

a pair of linings secured to said top surface of said base;

a first lining having a first part of predetermined extent that corresponds in size and configuration to said first opening, said first part being disposed orthogonally to a plane of said base and being spaced radially outwardly of said first opening;

a first stop means for limiting sliding insertion of a can through said first opening to a predetermined extent;

said first lining having a second part connected to and disposed normal to said first part and parallel to said base, said second part extending radially inwardly for a predetermined distance from a free end of said first part, said predetermined distance being sufficient to position a radially innermost end of said second part radially inwardly of a perimeter of said first opening by a predetermined distance, said second part being said stop means;

said radially innermost end of said second part defining a first lid-receiving opening having a predetermined size greater than that of a pull-top lid so that said lid is removable from said can through said first lid-receiving opening when a rim of said can is disposed in abutting relation to said stop means;

a second lining having a first part of predetermined extent that corresponds in size and configuration to said second opening, said first part of said second lining being disposed orthogonally to a plane of said base and being spaced radially outwardly of said second opening;

a second stop means for limiting sliding insertion of a can through said second opening to a predetermined extent;

said second lining having a second part connected to and disposed normal to said first part of said second lining and parallel to said base, said second part of said second lining extending radially inwardly for a predetermined distance from a free end of said second part of said second lining, said predetermined distance being sufficient to position a radially innermost end of said second part of said second lining radially inwardly of a perimeter of said second opening by a predetermined distance, said second part of said second lining being said stop means;

said radially innermost end of said second part of said second lining defining a second lid-receiving opening having a predetermined size greater than that of a pull-top lid so that said lid is removable from said can through said second lid-receiving opening when a rim of said can is disposed in abutting relation to said stop means;

whereby a person resting a palm of a first hand on said base grips said second lining with said first hand and pulls said lid off with a second hand, said second lining spacing said first hand away from exposed sharp edges of said lid and said palm preventing movement of said base and hence of said can.

5. The device of claim 4, wherein said configuration of said first opening is different from the configuration of said second opening.

6. The device of claim 5, wherein said first part of said second lining is integrally formed with said second part of said second lining.

7. The device of claim 6, wherein said second lining and said base are integrally formed with one another.

8. A device for use with pull-top cans having lids with exposed sharp edges when pulled away from the can, comprising:

a flat base having a predetermined thickness and having an upper surface and a lower surface;

a first and a second opening formed in said base in overlapping relation to one another;

each opening of said first and second openings having a predetermined size and configuration and said first opening having a differing size relative to said second opening and each opening being adapted to slidingly receive a can of corresponding size and configuration having a longitudinal axis of symmetry disposed normal to a plane of said base;

a lining secured to said top surface of said base;

said lining having a first part of predetermined extent that corresponds in size and configuration to said overlapping openings, said first part of said lining being disposed orthogonally to a plane of said base and being spaced radially outwardly of said overlapping openings;

a first stop means for limiting sliding insertion of a first can through said first opening and of a second can through said second opening to a common predetermined extent;

said lining having a second part connected to and disposed normal to said first part and parallel to said base, said second part extending radially inwardly for a predetermined distance from a free end of said first part, said predetermined distance being sufficient to position a radially innermost end of said second part radially inwardly of a perimeter of said overlapping openings by a predetermined distance, said second part being said stop means;

said radially innermost end of said second part defining a first and a second lid-receiving opening having a predetermined size greater than that of a pull-top lid so that a lid is removable from said first can through said first lid-receiving opening when a rim of said first can is disposed in abutting relation to said stop means and so that a lid is removable from said second can through said second lid-receiving opening when a rim of said second can is disposed in abutting relation to said stop means;

whereby a person resting a palm of a first hand on said base pulls said lid off with a second hand, said lining spacing said first hand away from exposed sharp edges of said lid and said palm preventing movement of said base and hence of said can.

9. The device of claim 8, wherein said configuration of said first opening is different from the configuration of said second opening.

10. The device of claim 9, wherein said first part of said lining is integrally formed with said second part of said lining.

11. The device of claim 10, wherein said lining and said base are integrally formed with one another.

12. The device of claim 1, wherein said base has a first end and a second end, wherein said opening is formed in said first end, and wherein said second end has a transverse extent slightly less than a transverse extent of said first end.

13. The device of claim 1, wherein said base has a first end and a second end, wherein said opening is formed in said first end, and wherein said second end has a transverse extent substantially less than a transverse extent of said first end.

14. The device of claim 13, wherein said second end forms a handle that facilitates gripping of said second end.

* * * * *